2,819,296

PREPARATION OF HYDROXYALKYL ACRYLATES

Joseph J. Carnes, Stamford, and Frank M. Cowen, Norwalk, Conn., assignors to American Cyanamid Company, New York, N. Y., a corporation of Maine No Drawing. Application June 7, 1956
Serial No. 589,871

12 Claims. (Cl. 260—486)

This invention relates to the preparation of acrylate esters, and more particularly to a novel method for preparing hydroxyalkyl esters of acrylic and methacrylic acids from such acids and alkylene oxides. Still more particularly, the invention is concerned with a tertiary amine catalyzed reaction of acrylic or methacrylic acid with alkylene oxides in the presence of small amounts of a water-soluble inorganic nitrite as a polymerization inhibitor.

Processes for the preparation of acrylate esters have long been known. One of the better known processes is directed to the reaction of acrylic acid or methacrylic acid with an alkylene oxide at temperatures ranging from 50° C. to 80° C. in the presence of a tertiary amine having dissociation constant in water at 25° C. of from about $1 \times 10^{-8}$ to about $1 \times 10^{-10}$. Unfortunately, this process must be conducted batchwise and the time period for effecting complete reaction is unduly long. These reaction times are necessarily long because the temperatures required for reaction are maintained at a low level, usually not more than about 80° C., for otherwise acrylic or methacrylic acid will polymerize. Moreover, the reaction usually requires the presence of polymerization inhibitors, such as hydroquinone. Even in the presence of such polymerization inhibitors, the reaction usually requires some twenty-four to forty-eight hours.

Because increased demands for acrylates and methacrylates have been made upon the chemical industry, a constant search for improved methods for their preparation have been vigilantly pursued. A process which allows for the preparation of acrylate esters within a time period of an hour or even less would be highly desirable.

It is, therefore, an object of the present invention to provide a more commercially acceptable process for preparing acrylate and methacrylic esters. A further object of the invention is to provide a process for effecting reaction between an acrylic acid and an alkylene oxide within commercially acceptable reaction times of one hour or less.

These, and other objects, which will become apparent to those skilled in the art from the hereinafter set forth description, have been unexpectedly attained in a simple, expeditious and straightforward manner. By effecting reaction within sixty minutes or less in the presence of a water-soluble inorganic nitrite, it has been unexpectedly found that an acrylic acid reactant with an alkylene oxide and resultant ester can be stabilized against polymerization for extended periods of time at elevated temperatures.

According to the present invention, hydroxyalkyl esters of acrylic acid or methacrylic acid are produced in good yield and purity by bringing into reactive combination an alkylene oxide with acrylic or methacrylic acid at a temperature of at least 100° C. for not more than about one hour in the presence of both (1) a tertiary amine catalyst and (2) a water-soluble inorganic nitrite polymerization inhibitor. It is indeed surprising to find that reaction proceeds rapidly either in a batch or continuous manner in the absence of any observable polymerization of reactant or formed product, notwithstanding the use of elevated temperatures above about 100° C. which can be employed herein to advantage.

As stated above, any of a large variety of water-soluble inorganic nitrites can be employed as the polymerization inhibitor. The inorganic nitrite may be more specifically characterized by the general formula: $M-(NO_2)_n$, wherein M generally denotes alkali metals, such as sodium and potassium. Although the latter are merely illustrative of the class of inorganic nitrites which may be used herein, it should be understood that any of a variety of commercially-available inorganic nitrites is effective for the purpose of the present process.

The amount of inorganic nitrite used herein may vary over a wide range of about 0.1% to about 2%, based on the weight of the particular acrylic acid feed. In general, it is a good practice to employ an intermediate range of about 0.25% to about 0.5% for best results.

As hereinbefore set forth, an alkylene oxide is reacted with either acrylic acid or methacrylic acid in the presence of a tertiary amine catalyst. The reaction proceeds by reacting equimolar quantities of alkylene oxide with acrylic acid or methacrylic acid. However, it is a good practice to employ a slight excess of the alkylene oxide with respect to the acrylic acid to insure high yields of resultant ester. For example, a ratio of from 1.05 to 1.10 mols of alkylene oxide to one (1) mol of the acid reactant is found particularly advantageous. The alkylene oxides which may be employed herein include, for example, ethylene oxide, propylene oxide or butylene oxide, which when reacted with acrylic acid or methacrylic acid results in the preparation of the corresponding hydroxyalkyl esters of said acids. To insure a good rate of reaction, tertiary amines are utilized either as such or in the form of the tertiary amine salt of either the acrylic acid or methacrylic acid. Such amines are, for instance, trimethylamine, triethylamine, tripropylamine, tributylamine, dimethylaniline, pyridine, dimethylpyridine, and the like. The amine catalyst is employed in the proportion of from 0.1% to 10% based on the weight of the acrylic acid or methacrylic acid.

In general, reaction occurs at temperatures in excess of about 100° C. Hence, a wide range of temperatures, namely from 100° C. to 140° C. may be advantageously employed herein. It has been found that temperatures of from about 125° C. to 130° C. may be employed to complete the reaction within ten to fifteen minutes. Accordingly, a time period of less than one hour can be employed for effecting completion of reaction.

It is an advantage of the present invention that the reaction may be carried out at atmospheric pressure. However, superatmospheric pressure can be used, preferably from about two to five atmospheres or above.

It is a further advantage of the invention that the hereinbefore described reaction can be conducted in a continuous manner. Prior to the discovery of the use of an inorganic nitrite as the polymerization inhibitor for the acrylate process described herein, only a carefully-controlled batch process was commercially possible due to the long residence time required for the completion of the reaction. Even then, considerable polymer formation was observed. However, the present invention permits the use of a continuous process, because higher temperatures than heretofore known and lower residence time for effecting the complete reaction are made available.

To facilitate a further understanding of the invention, the following examples are given by way of illustration and not by way of limitation. Unless otherwise stated, the parts given are by weight.

Example 1

Into a suitable reactor is pumped 73 parts of acrylic acid containing 5 parts of trimethylamine, 48 parts of ethylene oxide and 0.3% of sodium nitrite based on the weight of acrylic acid. The reaction mixture was heated to a temperature of about 120° C. and there held for about 30 minutes and thereafter distilled under reduced pressure which resulted in 107 parts of β-hydroxyethyl acrylate as a colorless liquid boiling at 62° C.–65° C./1 mm. Hg.

Example 2

The procedure of Example 1 is repeated except that potassium nitrite is substituted for sodium nitrite and pyridine is substituted for the trimethylamine with resultant ester formation in the absence of observable polymerization product.

Example 3

A mixture of 48.4 parts of ethylene oxide, 86 parts of methacrylic acid, 5 parts of triethylamine, and 0.25% sodium nitrite based on the weight of methacrylic acid in the form of a 30% aqueous solution is fed to a suitable reactor continuously under the pressure of 50 p. s. i. and held at a temperature of about 125° C. Reaction occurs within the reactor in 13 minutes and the contents are continuously removed. Distillation of the reaction mixture under reduced pressure results in 120 parts of β-hydroxyethyl methacrylate as a colorless liquid boiling at 67° C.–69° C./1.5–2 mm. Hg.

Example 4

To a suitable reaction vessel is continuously fed a mixture of 86 parts of methacrylic acid containing 5 parts of triethylamine, 64 parts of propylene oxide and 0.25% sodium nitrite based on the weight of methacrylic acid. The mixture is heated to a temperature of 120° C. for 25 minutes, and then continuously operated for about 30 hours without the formation of any acrylate polymers. Resultant reaction mixture is then distilled under reduced pressure giving 123 parts of 2-hydroxypropyl-α-methacrylate as a colorless liquid boiling at 60° C.–62° C./1 mm. Hg.

Example 5

A mixture containing 86 grams of methacrylic acid containing 0.5 part of triethylamine, 73 parts of butylene oxide, and 0.25 part of sodium nitrite based on the weight of methacrylic acid, is continuously fed to a reactor and held within the reactor for a period of not more than 15 minutes at a temperature of from 120° C. to 130° C. and is thereafter withdrawn. Additional methacrylic acid and butylene oxide is then metered into the reaction vessel. Resultant reaction mixture is continuously removed and distilled under reduced pressure to give 82 parts of colorless liquid boiling at 53° C.–55° C./0.5 mm. Hg.

In each of these above examples, the procedure is to effect continuous reaction between the alkylene oxide and the acrylic acid reactants. The residence time for reaction is not more than one hour. At the end of this period, the contents in the reaction vessel are withdrawn and additional alkylene oxide and methacrylic acid containing catalyst in the presence of water soluble inorganic nitrite is added. Resultant reaction mixture, as described above, is then distilled to recover substantially colorless liquid comprising a corresponding hydroxyalkyl acrylate ester.

The water-soluble nitrite as indicated above may be added in the form of its aqueous solution. However, for certain purposes, if desired, it may be added as a solid, although the latter is not a preferred embodiment. It is obviously more desirable from a materials handling viewpoint to introduce the polymerization inhibitor in the form of its solution.

Under the conditions set forth above, the process can be operated continuously at temperatures within the range of from 100° C. to 140° C. without the formation of any observable polymer. Should reaction between alkylene oxide and acrylic acid be conducted at temperatures appreciably above 140° C., reduced yields of acrylate ester is obtained due to rapid polymer formation.

We claim:

1. A process for the preparation of an hydroxyalkyl acrylate which comprises: bringing into reactive combination for not more than about one hour approximately equimolecular amounts of an alkylene oxide containing from two to four carbon atoms and a monocarboxylic acid selected from the group consisting of acrylic acid and methacrylic acid in the presence of a tertiary amine catalyst at temperatures within the range of from about 100° C. to about 140° C. in the presence of a water-soluble alkali metal nitrite, and recovering the corresponding hydroxyalkyl acrylate.

2. A process according to claim 1 in which the water-soluble nitrite is sodium nitrite.

3. A process according to claim 1 in which the water-soluble nitrite is potassium nitrite.

4. A process according to claim 1 in which the nitrite is present within the range of from about 0.1% to 2% based on the weight of the corresponding monocarboxylic acid feed.

5. A process according to claim 1 in which the tertiary amine catalyst is present in an amount ranging from about 0.1% to about 5% based on the weight of the monocarboxylic acid feed.

6. A process according to claim 1 in which the reaction occurs at a temperature from about 120° C. to 130° C.

7. A process for the preparation of hydroxyalkyl acrylates which comprises: continuously bringing into reactive combination approximately equimolecular amounts of an alkylene oxide containing from two to four carbon atoms and a monocarboxylic acid selected from the group consisting of acrylic acid and methacrylic acid in the presence of a tertiary amine catalyst at a temperature within the range of about 100° C. to about 140° C. and in the presence of a water-soluble alkali metal nitrite, and continuously recovering the corresponding hydroxyalkyl acrylate ester.

8. A process according to claim 7 in which the tertiary amine is triethylamine.

9. A process according to claim 7 in which the alkylene oxide is ethylene oxide and the monocarboxylic acid is methacrylic acid.

10. A process according to claim 7 in which the nitrite is potassium nitrite.

11. A process according to claim 7 in which the nitrite is sodium nitrite.

12. A process according to claim 11 in which the sodium nitrite is present to the extent of about 0.25% based on the weight of the monocarboxylic acid.

References Cited in the file of this patent
UNITED STATES PATENTS

| Number | Name | Date |
|---|---|---|
| 2,484,487 | Caldwell | Oct. 11, 1949 |
| 2,485,277 | Gilbert | Oct. 18, 1949 |
| 2,741,583 | Vaughan et al. | Apr. 10, 1956 |